3,402,197
FLUOROCHLOROALKANE SULFONATES
Henry R. Nychka, Randolph Township, Morris County, N.J., assignor to Allied Chemical Corporation, New York, N.Y., a corporation of New York
No Drawing. Filed Nov. 16, 1964, Ser. No. 411,635
2 Claims. (Cl. 260—513)

ABSTRACT OF THE DISCLOSURE

Fluorocarbon compounds of the class consisting of the saturated fluorocarbon sulfonic acids having the formula $$RSO_3H$$

wherein R is an alphahydro perfluorochloroalkyl or perfluorochloroalkyl radical containing an average of 5 to 20 carbon atoms and a ratio of fluorine to chlorine atoms of about 3 to 1, and the corresponding metal and ammonium salts. These compounds have surface active properties rendering them useful as surface tension reducing agents, wetting agents, dispersing agents and emulsifying agents.

---

The present invention relates to a new class of fluorochlorocarbon compounds, particularly fluorochloroalkyl sulfonic acids and salts thereof.

The novel fluorochlorocarbon compounds of this invention are of the class consisting of the saturated fluorochlorocarbon sulfonic acids having the formula $$RSO_3H$$

wherein R is a member of the group consisting of alphahydro perfluorochloralkyl and perfluorochloroalkyl radicals containing an average of 5 to 20 carbon atoms and a ratio of fluorine to chlorine atoms of about 3 to 1 and the corresponding metal and ammonium salts. In all of these fluorochlorocarbon compounds the sulfur atom is directly bonded to a carbon atom.

Alphahydro perfluorochloroalkyl sulfonates having the formula $$RSO_3X$$

wherein R is an alphahydro perfluorochloralkyl radical containing an average of 5 to 20 carbon atoms, preferably 6 to 10 carbon atoms, and a ratio of fluorine to chlorine atoms of about 3 to 1 and X is a member of the group consisting of metal and ammonium radicals may be prepared by a process which comprises reacting an oil comprising perfluorochloroalkenes having a boiling point of about 40° to 175° C. at 5 mm. Hg pressure, obtained by pyrolysis of polytrifluorochloroethylene, with sulfur trioxide to form the corresponding sultones, treating the sultones with water to form alphahydro perfluorochloroalkyl sulfonyl fluorides and hydrolyzing the sulfonyl fluorides with a member of the group consisting of metal oxides, metal hydroxides and ammonium hydroxide to form the desired alphahydro perfluorochloroalkyl sulfonates.

The perfluorochloroalkene oil employed as reactant is derived from the pyrolysis product of polytrifluorochloroethylene. Included in the term "polytrifluorochloroethylene" is not only the homopolymer of trifluorochloroethylene but also copolymers and terpolymers of trifluorochloroethylene with up to about 5% by weight of other ethylenically unsaturated compounds, including tetrafluoroethylene and vinylidene fluoride. It is a particular feature of this invention that the polytrifluorochloroethylene may comprise polymer scraps which are normally encountered in the fabrication of the trifluorochloroethylene polymers. These polymers may be readily pyrolyzed by procedures described in U.S.P.'s 2,420,222, 2,664,449 and 2,969,403.

The pyrolysis product comprises a mixture of perfluorochloroalkenes and perfluorochloroalkanes of varying carbon chain length. The product is then distilled to give a fraction containing perfluorochloroalkenes which may be represented by the formula $$CF_2Cl-(CF_2 \cdot CFCl)_n-CF=CF_2$$

wherein $n$ ranges from 2 to 9. Such fraction generally contains about 40 to 50 percent by weight of perfluorochloroalkenes and about 50 to 60 percent by weight of perfluorochloroalkanes.

For use in the process described above, a fraction having a boiling point of about 40° to 175° C. at 5 mm. Hg pressure is generally employed. This fraction comprises a mixture of perfluorochloroalkenes and perfluorochloroalkanes in which the perfluorochloroalkenes have 2 to 9 —$CF_2 \cdot CFCl$— groups. It is preferred to employ a fraction having a boiling point of about 80° to 140° C. at 5 mm. Hg pressure, such fraction comprising a mixture of perfluorochloroalkenes and perfluorochloroalkanes in which the perfluorochloroalkenes have 2 to 4

$$-CF_2 \cdot CFCl-$$

groups.

The pyrolysis oil is reacted with sulfur trioxide, preferably stabilized liquid sulfur trioxide, whereby the perfluorochloroalkenes are converted to the corresponding sultones. This reaction is carried out using about 1.0 to 1.2 mols of sulfur trioxide, preferably about 1.0 to 1.05 mols, per mol of perfluorochloroalkene content. The temperature is maintained at about 25° to 90° C., preferably about 40° to 70° C., for a period of at least about 70 hours.

The reaction mixture containing the sultones is then treated with water, thereby causing isomerization of the sultones and subsequent decarboxylation of the isomerized sultones with the liberation of carbon dioxide to form alphahydro perfluorochloroalkyl sulfonyl fluorides in which the perfluorochloroalkyl radical contains an average of 5 to 20 carbon atoms, preferably 6 to 10 carbon atoms. The amount of water employed is generally about one-tenth to one-third the weight of the sultones, and preferably about one-fifth to one-quarter of the weight of the sultones. The water addition is carried out at temperature of about 25° to 50° C., preferably about 25° to 35° C. Upon treatment with water, aqueous and oil phases are formed.

The lower oil phase which comprises a mixture of the alphahydro perfluorochloroalkyl sulfonyl fluorides and perfluorochloroalkanes is separated, as by decantation, and then hydrolyzed with an aqueous solution of a metal oxide or hydroxide or ammonium hydroxide, preferably an alkali metal (e.g. Na, K or Li) hydroxide, alkaline earth metal (e.g. Ca, Mg) hydroxide or ammonium hydroxide. The oxide or hydroxide is employed in ratio of about 1.0 to 1.5, preferably about 1.1 to 1.2 mols per mol of the sulfonyl fluorides. The temperature maintained during the hydrolysis reaction is about 25° to 60° C., preferably about 35° to 45° C. The alphahydro perfluorochloroalkyl sulfonyl fluorides are thereby converted to the corresponding alphahydro perfluorochloroalkyl sulfonates. The sulfonates are present in an upper aqueous phase while the perfluorochloroalkanes remain in a lower oil phase.

The aqueous phase is separated, as by decantation, and is then evaporated to dryness to isolate the alphahydro perfluorochloroalkyl sulfonates. If desired, the sulfonates may be further purified by extracting the residue with a suitable solvent such as absolute ethanol and then evaporating the extract to dryness.

The predominant reactions believed to be involved in the preparation of the alphahydro perfluorochloroalkyl sulfonates, with specific reference to the sodium salt, are illustrated by the following equations. In the equations, R' is predominantly $CF_2Cl(CF_2 \cdot CFCl)_n$.

(1) $R'CF=CF_2 + SO_3 \longrightarrow R'CF\text{—}CF_2$
$\qquad\qquad\qquad\qquad\qquad\quad |\quad\quad\ |$
$\qquad\qquad\qquad\qquad\qquad\ SO_2\text{—}O$ (2) $R'CF\text{—}CF_2$
$\quad\ |\quad\quad\ | + H_2O \longrightarrow R'CHFSO_2F + CO_2 + HF$
$\ SO_2\text{—}O$ (3) $R'CHFSO_2F + 2NaOH \longrightarrow R'CHFSO_3Na + NaF + H_2O$ It was quite surprising that the desired product may be obtained in high yields starting with a crude oil fraction containing perfluorochloroalkanes as well as perfluorochloroalkenes. Even more surprising was that high product yields may be realized when the crude oil fraction is derived from scraps of trifluorochloroethylene polymers.

The corresponding sulfonic acids may be readily prepared by distillation from a mixture of the sulfonates and 100% sulfuric acid solution.

Perfluorochloroalkyl sulfonates of the formula $$RSO_3X$$

wherein R is a perfluorochloroalkyl radical containing an average of 5 to 20 carbon atoms, preferably 6 to 10 carbon atoms, and a ratio of fluorine to chlorine atoms of about 3 to 1 and X is a member of the group consisting of metal and ammonium radicals may be prepared by reacting the alphahydro perfluorochloroalkyl sulfonyl fluorides (admixed with perfluorochloroalkanes), obtained as described above, with fluorine to form the corresponding perfluorochloroalkyl sulfonyl fluorides. This fluorination is carried out using at least a stoichiometric amount, and preferably at least about 100% excess of fluorine, at temperature of about 25° to 75° C., preferably about 25° to 50° C.

The perfluorochloroalkyl sulfonyl fluorides thus obtained are hydrolyzed with an aqueous solution of a metal oxide or hydroxide or ammonium hydroxide, preferably an alkali metal, alkaline earth metal or ammonium hydroxide, to form an aqueous solution of the desired perfluorochloroalkyl sulfonates. The oxide or hydroxide is employed in ratio of about 1.0 to 1.5, preferably about 1.1 to 1.2, mols per mol of the sulfonyl fluorides. The temperature maintained during the hydrolysis reaction is about 25° to 60° C., preferably about 35° to 45° C. The desired sulfonates are present in a lower oil phase while the perfluorochloroalkanes remain in an upper aqueous phase. The oil phase is separated, and the aqueous phase is evaporated to dryness in order to isolate the perfluorochloroalkyl sulfonates. If desired, the sulfonates may be further purified by extracting the residue with a suitable solvent such as absolute ethanol and then evaporating the extract to dryness.

The perfluorochloroalkyl sulfonates may be prepared from substantially pure alphahydro perfluorochloroalkyl sulfonyl fluorides in which the alphahydro perfluorochloroalkyl radical contains 5 to 20 carbon atoms and a ratio of fluorine to chlorine atoms of 3 to 1. For the sake of economy, however, the alphahydro perfluorochloroalkyl sulfonyl fluorides are used in the form of crude mixtures with perfluorochloroalkanes, obtained as described above.

The perfluorochloroalkyl sulfonates may be readily converted to the corresponding sulfonic acids by distillation from a mixture of the sulfonates and 100% sulfuric acid solution.

The reactions believed to occur in the preparation of the perfluorochloroalkyl sulfonates, with specific reference to the sodium salt, are illustrated by the following equations:

(1) $\quad R'CHFSO_2F + F_2 \rightarrow R'CF_2SO_2F + HF$ (2) $R'CF_2SO_2F + 2NaOH \rightarrow R'CF_2SO_3Na + NaF + H_2O$ It was quite unexpected when the alphahydro perfluorochloroalkyl sulfonyl fluorides having an average of up to 20 carbon atoms were reacted with fluorine to substitute fluorine for hydrogen with negligible, if any, loss of the sulfonyl fluoride group. As known to those skilled in the art, the substitution of fluorine for hydrogen using direct fluorination techniques is frequently accompanied by significant loss of group functionality, considerable product degradation and tar formation. These undesirable results are particularly accentuated when relatively long chain carbon compounds, such as octane sulfonyl chloride and higher carbon-containing analogs, are fluorinated.

Other routes have been suggested for preparing perhaloalkyl sulfonyl fluorides. For example, perhaloalkyl sulfonyl fluorides have been prepared by telomerization processes. Thus, $CF_2=CF_2$ has been telomerized in the presence of $SO_2FCl$ telogen to give telomers such as $Cl(CF_2CF_2)_nSO_2F$ where $n$ varies from 2 to 150. Such processes do not permit obtainment of sulfonyl fluorides having a relatively narrow molecular weight range.

The fluorochlorocarbon compounds of the present invention have surface active properties rendering them suitable for use as surface tension reducing agents, wetting agents, dispersing agents, emulsifying agents, etc. The perfluorochloroalkyl sulfonates have particularly outstanding surface active properties and, in addition, are resistant to drastic alkaline or thermal conditions. In particular, these sulfonates have been found to be ideally suitable as dispersing agents for polymerizing tetrafluoroethylene.

Although related perfluoroalkyl sulfonic acids and sulfonates are useful as surface active agents, the presence of chlorine in the instant compounds has the advantage of rendering them less volatile and more soluble in oil and water systems.

The preparation of alphahydro perfluorochloroalkyl sulfonates and perfluorochloroalkyl sulfonates may be exemplified by the following examples in which parts are by weight.

EXAMPLE 1

Five 250 part samples of a terpolymer of trifluorochloroethylene comprising about 96 percent by weight of trifluorochloroethylene, about 3 percent by weight of tetrafluoroethylene and about 1 percent by weight of vinylidene fluoride were pyrolyzed at 375–425° C. and at 50 mm. Hg pressure in an equal weight of anyhdrous copper sulfate catalyst. Vacuum distillation of the pyrolysis oil gave a fraction having a boiling point of about 50–80° C. at 5 mm. Hg pressure. A mixture of 110 parts of this fraction and 8 parts of stabilized liquid sulfur trioxide were maintained at 82° C. for three days and then at room temperature for an additional five days. The gradual formation of sultones was followed by periodically comparing increases in the log ratios of the infrared absorption peaks of the sultone group to the olefin group. The sultone and olefin groups absorbed at 6.90 microns and 5.55 microns, respectively. When no further increase took place, the sulfonation was stopped. The reaction mixture was then treated with about 10 parts of water to cause isomerization of the sultones and subsequent decarboxylation of the resulting compounds. Aqueous and oil phases formed. The oil phase comprising a mixture of alphahydro perfluorochloroalkyl sulfonyl fluorides and perfluorochloroalkanes was separated. The infrared spectrum of the alphahydro perfluorochloroalkyl sulfonyl fluorides showed the appearance of a new carbon-hydrogen bond at 3.30 microns and also the sulfonyl fluoride group at 6.85 microns.

A 104 part sample of the alphahydro perfluorochloroalkyl sulfonyl fluoride and perfluorochloroalkane mixture was hydrolyzed with 1 N caustic soda solution at maximum temperature of 40° C. Aqueous and oil phases formed. The aqueous phase was separated from the oil phase containing perfluorochloroalkanes and was then evaporated to dryness to give 46.5 parts of crude alpha-hydro perfluorochloroalkyl sodium sulfonates. The sulfonates were extracted with absolute ethanol, and the extract was evaporated to dryness to give as product a slightly off-white free-flowing powder.

The other three fractions obtained by pyrolysis of the trifluorochloroethylene polymer were converted to the sulfonates in a similar manner. The second fraction had a boiling point of 80–110° C./5mm.; the third fraction had a boiling point of 110–140° C./5 mm. and the fourth fraction had a boiling point of 140–170° C./5 mm.

Analytical results of the various products are set forth below.

| Oil fraction used | Average molecular weight of sulfonate product | Elemental analysis of product | | | Average number of carbon atoms in product |
|---|---|---|---|---|---|
| | | Percent F | Percent Cl | Percent S | |
| 1 | 450 | 32.5 | 21.0 | 7.38 | 6 |
| 2 | 545 | 38.5 | 22.4 | 5.74 | 7.5 |
| 3 | 605 | 39.0 | 22.7 | | 8.5 |
| 4 | 945 | 46.3 | 24.7 | 3.16 | 15 |

The products exhibited the following surface tension measurements (at 25° C.) expressed as dynes/cm. Concentrations are precent by weight of product in water.

| Average molecular weight of sulfonate product | Concentration | | | | |
|---|---|---|---|---|---|
| | 2% | 1% | 0.50% | 0.25% | 0.125% |
| 450 | 32.7 | 33.4 | 39.4 | 42.3 | |
| 535 | 31.8 | 31.4 | 30.8 | 32.1 | 35.6 |
| 605 | | 31.7 | 32.2 | 31.8 | 32.9 |
| 945 | | 32.1 | 32.6 | 34.2 | 35.8 |

EXAMPLE 2

A 1500 part sample of the trifluorochloroethylene terpolymer of Example 1 was pyrolyzed portionwise in the presence of anhydrous copper sulfate catalyst at temperature of 400° C. and at pressure of 100 mm. Hg. The resulting pyrolysis oil was vacuum distilled to give 818 parts of a distillate boiling at 45–171° C. at 5 mm. Hg pressure. A 750 part sample of this distillate was admixed with 45 parts of stabilized liquid sulfur trioxide and maintained at 40–70° C. for 70 hours. Periodic infrared spectra taken during the sulfonation showed the gradual increase of the sultone absorption peak at 6.90 microns with a corresponding decrease in the olefin absorption peak at 5.55 microns. When the logarithmic ratio of the respective infrared absorption peaks of the sultone to the olefin no longer increased, sulfonation was stopped. The sultone reaction mixture was then treated with about 150 parts of water to cause isomerization and subsequent decarboxylation of the isomerized product. The infrared spectrum of the resulting alphahydro perfluorochloroalkyl sulfonyl fluorides showed prominent absorption peaks for the C-H bond at 3.32 microns and for the sulfonyl fluoride group at 6.83 microns. The sulfonyl fluorides contained 0.3% hydrogen.

To a 559 part sample of the alphahydro perfluorochloroalkyl sulfonyl fluorides, fluorine gas admixed with an equal volume of nitrogen gas was passed in at a rate of about 5.7 parts per hour over a 43 hour period at temperature of 25–70° C. The fluorination was carried out in apparatus comprising a nickel vessel which permitted introduction of the fluorine and nitrogen gaseous mixture through a jet nozzle located at the bottom of the vessel. The gaseous mixture impinged upon a 1200 r.p.m. turbine stirrer which gave a high degree of mixing between gas and liquid phases. Fluorine was introduced until the infrared spectrum no longer showed absorption for the C-H bonding. Quantitative analysis for hydrogen by nuclear magnetic resonance was 100 p.p.m. or a thirty-fold decrease in the hydrogen content. A comparison of the intensities of the infrared absorption for the sulfonyl fluoride group before and after fluorination indicated practically no loss of the sulfonyl fluoride group during fluorination.

A 534 part charge of the resulting perfluorochloroalkyl sulfonyl fluorides was vacuum distilled to give the following fractions:

| Fraction | B.P., ° C./5 mm. | Parts |
|---|---|---|
| 1 | 62–102 | 111 |
| 2 | 102–140 | 177 |
| 3 | 140–180 | 110 |
| Residue | | 83 |

Each of the above fractions was hydrolyzed under alkaline conditions at temperature of 60° C. The hydrolysis and product isolation was carried out in the following typical manner. To a stirred mixture of 125 parts of fraction 2 and 250 parts of water at 60° C., a concentrated caustic soda solution was slowly added until it was no longer being consumed. The pH of the resulting solution comprising aqueous and oil phases was adjusted to neutrality, and the oil phase consisting mainly of perfluorochloroalkanes was removed by phase separation. The aqueous phase was taken to dryness and then extracted with absolute ethanol. The extract was finally evaporated to dryness to give 30 parts of white free-flowing powder comprising perfluorochloroalkyl sodium sulfonates as product.

Analytical results of the perfluorochloroalkyl sodium sulfonates obtained from fractions 1, 2 and 3 are tabulated below.

| Fraction | Average molecular weight of sulfonate product | Elemental analysis of product | | | Average carbon length of product |
|---|---|---|---|---|---|
| | | Percent F | Percent Cl | Percent S | |
| 1 | 490 | 42.5 | 22.3 | 5.33 | 6.5 |
| 2 | 575 | 41.5 | 22.6 | 4.61 | 8 |
| 3 | 690 | 44.5 | 22.2 | 3.50 | 10 |
| Residue | 1,090 | 45.5 | 19.1 | 2.10 | 17 |

The products exhibited the following surface tension measurements (at 25° C.) expressed as dynes/cm. Concentrations are in terms of percent by weight of water.

| Average Molecular Weight | Concentration | | | |
|---|---|---|---|---|
| | 1.0% | 0.5% | 0.25% | 0.125% |
| 490 | 30.4 | 32.2 | 39.3 | |
| 575 | 32.9 | 32.5 | 31.6 | 30.6 |
| 690 | 30.5 | 30.9 | 31.6 | 31.7 |
| 1,090 | 44.5 | | 45.4 | |

The use of the perfluorochloroalkyl sulfonates of the present invention for preparing aqueous colloidal dispersions of polytetrafluoroethylene represents a particular embodiment of this invention. The conditions for carrying out aqueous dispersion polymerization of tetrafluoroethylene such as temperature, pressure, catalyst concentration, dispersing agent concentration, etc. are well known to those skilled in the art.

The polymerization temperature may vary from 25–100° C., depending on the type of catalyst employed. The temperature is chosen to correspond with the decomposition rate of the catalyst. Improper choice of temperature can cause too high rate of reaction and low molecular weight polymer. Physical characteristics of the polymer are also dependent upon temperature of reaction.

The polymerization pressure may vary over wide limits, 100 to 500 p.s.i. being the preferred range. At the lower pressures the polymerization rate and molecular weight of the polymer are low, while at the higher pressures the polymerization rate and the molecular weight of the polymer are increased.

The catalysts are usually water soluble or partially water soluble. They can be inorganic, such as the alkali metal peroxydisulfates, perphosphates, etc., redox systems comprising persulfates and bisulfates, or organic, such as disuccinic acid peroxide. The catalyst concentration may vary from 0.001% to 1% by weight of the water. Conditions of operation vary for the above catalysts and proper choice of concentration and temperature are necessary to yield optimum polymerization rates, as well as high molecular weight and other desirable physical properties of the polymer.

The amount of dispersing agent used may vary from 0.01 to 2.0% by weight of the water. If the concentration is too low, the dispersion may be unstable or non-existent. If the concentration of dispersing agent is too high, particles having poor extrusion characeristics may be obtained.

In order to prevent the coagulation of the polymer latex during the polymerization, an anti-coagulant is employed. Suitable anti-coagulants include paraffin oils or waxes which are generally added in amounts of 1–10% by weight of the water.

Use of the perfluorochloroalkyl sulfonates of this invention as dispersing agent in the polymerization of tetrafluoroethylene is illustrated by the following examples in which parts are by weight.

EXAMPLE 3

The following were charged in a stainless steel autoclave equipped for rotary stirring:

| | Parts |
|---|---|
| Deionized, deoxygenated water | 1000 |
| Disuccinic acid peroxide | 1 |
| Dispersing agent [1] | 1 |
| Mineral oil | 65 |
| Iron | 0.008 |

[1] Perfluorochloroalkyl sodium sulfonates—average M.W.= 490; average chain length=6.5 carbons; percent F=42.5; percent Cl=22.3; percent S=5.33; surface tension=39.3 dynes/cm. at concentration 0.25% by weight of water.

After sealing and evacuating the autoclave, the contents were heated to 90° C. The tetrafluoroethylene was then pressured into the stirred polymerization medium at 400 p.s.i. and held constant for the duration of the run. At the end of 36 minutes the polymerization was stopped, and a colloidal dispersion of polytetrafluoroethylene of 27.2% by weight was obtained. No coagulated polymer was present. The polymerization rate was 630 g. per liter per hour.

EXAMPLE 4

The same apparatus was used as described in Example 3. The recipe was as follows:

| | Parts |
|---|---|
| Deionized, deoxygenated water | 100 |
| Disuccinic acid peroxide | 1.5 |
| Dispersing agent [1] | 2.5 |
| Iron | 0.008 |

[1] Perfluorochloroalkyl sodium sulfonates—average M.W.= 575; average chain length=8 carbons; percent F=41.5; percent Cl=22.6; percent S=4.61; surface tension=31.6 dynes/cm. at concentration 0.25% by weight of water.

After sealing and evacuating the autoclave, the contents were heated to 90° C. The tetrafluoroethylene was then pressured into the stirred polymerization medium at 400 p.s.i. and maintained for the duration of the run. After 29 minutes the polymerization was stopped, and a colloidal dispersion of polytetrafluoroethylene of 28% by weight was obtained. No coagulated polymer was present. The polymerization rate was 805 g. per liter per hour.

The resulting polytetrafluoroethylene dispersion was coagulated by low shear stirring, filtered and dried. The dry polytetrafluoroethylene was found to exhibit outstanding extrusion characteristics when an 80:20 mixture by weight of polymer and deobase were extruded through a small ram extruder.

Since various changes and modifications may be made in this invention without departing from the spirit thereof, the invention is deemed to be limited only by the scope of the appended claims.

I claim:

1. The process of preparing perfluorochloroalkyl sulfonates having the formula $RSO_3X$ wherein R is a perfluorochloroalkyl radical containing 5 to 20 carbon atoms and a ratio of fluorine to chlorine atoms of 3 to 1 and X is a member of the group consisting of metal and ammonium radicals which comprises reacting a substantially pure alphahydro perfluorochloroalkyl sulfonyl fluoride having the formula $RSO_2F$ wherein R is an alphahydro perfluorochloroalkyl radical containing 5 to 20 carbon atoms and a ratio of fluorine to chlorine atoms of 3 to 1 with at least a stoichiometric amount of fluorine at temperature of about 25° to 75° C. to form the corresponding perfluorochloroalkyl sulfonyl fluoride and hydrolyzing the latter sulfonyl fluoride with a member of the group consisting of metal oxides, metal hydroxides and ammonium hydroxide to form the desired perfluorochloroalkyl sulfonate.

2. The process of preparing perfluorochloroalkyl sulfonates having the formula $RSO_3X$ wherein R is a perfluorochloroalkyl radical containing 5 to 20 carbon atoms and a ratio of fluorine to chlorine atoms of 3 to 1 and X is a member of the group consisting of metal and ammonium radicals which comprises reacting an alphahydroperfluorochloroalkyl sulfonyl fluoride having the formula $RSO_2F$ wherein R is an alphahydro perfluorochloroalkyl radical containing 5 to 20 carbon atoms and a ratio of fluorine to chlorine atoms of 3 to 1 with at least a stoichiometric amount of fluorine at a temperature of about 25° to 75° C. to form the corresponding perfluorochloroalkyl sulfonyl fluoride and hydrolyzing the latter sulfonyl fluoride with a member of the group consisting of metal oxides, metal hydroxides and ammonium hydroxide to form the desired perfluorochloroalkyl sulfonate.

References Cited

UNITED STATES PATENTS

| 2,090,712 | 8/1937 | Wiezevich | 260—653.8 |
| 2,732,398 | 1/1956 | Brice et al. | 260—513 |
| 2,938,872 | 5/1960 | Cowan et al. | 260—513 |
| 3,041,317 | 6/1962 | Gibbs et al. | 260—543 |
| 3,046,304 | 7/1962 | Haszeldine | 260—513 |

DANIEL D. HORWITZ, Primary Examiner.